United States Patent
Lin et al.

(10) Patent No.: US 11,444,738 B2
(45) Date of Patent: Sep. 13, 2022

(54) METHOD FOR TRANSMITTING FEEDBACK INFORMATION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/221,748

(22) Filed: Apr. 2, 2021

(65) Prior Publication Data

US 2021/0226757 A1  Jul. 22, 2021

Related U.S. Application Data

(63) Continuation of application No. 16/995,802, filed on Aug. 17, 2020, now Pat. No. 10,999,041, which is a
(Continued)

(51) Int. Cl.
*H04B 7/02* (2018.01)
*H04L 5/00* (2006.01)
(Continued)

(52) U.S. Cl.
CPC .......... *H04L 5/0055* (2013.01); *H04L 1/1614* (2013.01); *H04L 1/1685* (2013.01); *H04L 1/1861* (2013.01)

(58) Field of Classification Search
CPC ... H04L 5/0055; H04L 1/1614; H04L 1/1685; H04L 1/1861; H04L 1/12
(Continued)

(56) References Cited

U.S. PATENT DOCUMENTS

2012/0076028 A1  3/2012  Ko et al.
2012/0320805 A1  12/2012  Yang et al.
(Continued)

FOREIGN PATENT DOCUMENTS

CN  104348597 A  2/2015
CN  107919948 A  4/2018
(Continued)

OTHER PUBLICATIONS

First Office action issued in corresponding Canadian Application No. 3,093,486, dated Oct. 8, 2021, 4 pages.
(Continued)

*Primary Examiner* — Don N Vo
(74) *Attorney, Agent, or Firm* — Bayes PLLC

(57) ABSTRACT

A method for transmitting feedback information includes receiving, by a terminal device, trigger signaling used for triggering transmission of feedback information for a plurality of downlink channel groups by the terminal device, wherein the plurality of downlink channel groups comprise a first downlink channel group and a second downlink channel group, and a group number of the first downlink channel group is smaller than a group number of the second downlink channel group; and generating, by the terminal device based on the trigger signaling, a feedback codebook comprising the feedback information for the plurality of downlink channel groups, wherein the feedback information corresponding to the second downlink channel group is appended to the feedback information corresponding to the first downlink channel group in the feedback codebook.

18 Claims, 5 Drawing Sheets

Related U.S. Application Data continuation of application No. PCT/CN2019/071466, filed on Jan. 11, 2019.

(51) Int. Cl.
*H04L 1/16* (2006.01)
*H04L 1/18* (2006.01)

(58) Field of Classification Search
USPC .................................. 375/267; 455/562.1
See application file for complete search history.

(56) References Cited

U.S. PATENT DOCUMENTS

| | | | |
|---|---|---|---|
| 2013/0128826 A1* | 5/2013 | Lin ..................... | H04W 72/04 370/329 |
| 2015/0146557 A1 | 5/2015 | Pan et al. | |
| 2019/0081764 A1* | 3/2019 | Guan .................... | H04L 5/0082 |
| 2019/0124633 A1* | 4/2019 | Hang ................ | H04W 72/0446 |
| 2019/0335427 A1 | 10/2019 | Sun et al. | |
| 2020/0092685 A1* | 3/2020 | Fehrenbach ............ | H04W 4/46 |
| 2020/0106569 A1 | 4/2020 | Tsai et al. | |
| 2020/0136780 A1 | 4/2020 | Chen | |
| 2021/0320776 A1* | 10/2021 | Aiba .................... | H04W 24/10 |

FOREIGN PATENT DOCUMENTS

| | | |
|---|---|---|
| RU | 2184424 C2 | 6/2002 |
| RU | 2341043 C1 | 12/2008 |
| RU | 2521486 C2 | 6/2014 |
| RU | 2620586 C1 | 5/2017 |

OTHER PUBLICATIONS

Communication pursuant to Article 94(3) EPC issued in corresponding European Application No. 19909218.0, dated Nov. 25, 2021, 6 pages.

First Office action issued in corresponding India Application No. 202017036942, dated Dec. 1, 2021, 6 pages.

"HARQ enhancements in NR unlicensed," Huawei, HiSilicon, 3GPP TSG RAN WG1 Meeting #94bis, R1 1810128, Chengdu, China, 8th Oct. 12, 2018, 10 pages.

"HARQ enhancements in NR unlicensed," Huawei, HiSilicon, 3GPP TSG RAN WG1 Meeting #95, R1 1812196, Spokane, USA, 12th Nov. 16, 2018, 13 pages.

"Discussion on HARQ operation for NR-U," vivo, 3GPP TSG RAN WG1 Meeting #94, R1-1808239, Gothenburg, Sweden, Aug. 20-24, 2018, 3 pages.

"Offline summary on UCI enhancements for URLLC," OPPO, 3GPP TSG RAN WG1 Meeting #95, R1-1814044, Spokane, USA, Nov. 12-16, 2018, 8 pages.

Extended European Search Report issued in corresponding European Application No. EP 19 90 9218, dated Feb. 16, 2021, 11 pages.

The First Office Action issued in corresponding Chinese Application No. 202010755859.9, dated May 30, 2022, 20 pages.

Extended European Search Report issued in corresponding European Application No. 22162047.9, dated May 6, 2022, 10 pages.

First Office Action issued in corresponding Russian Application No. 2020131401, dated May 6, 2022, 11 pages.

Second Office Action issued in corresponding Canadian Application No. 3093486, dated Jul. 14, 2022, 4 pages.

* cited by examiner

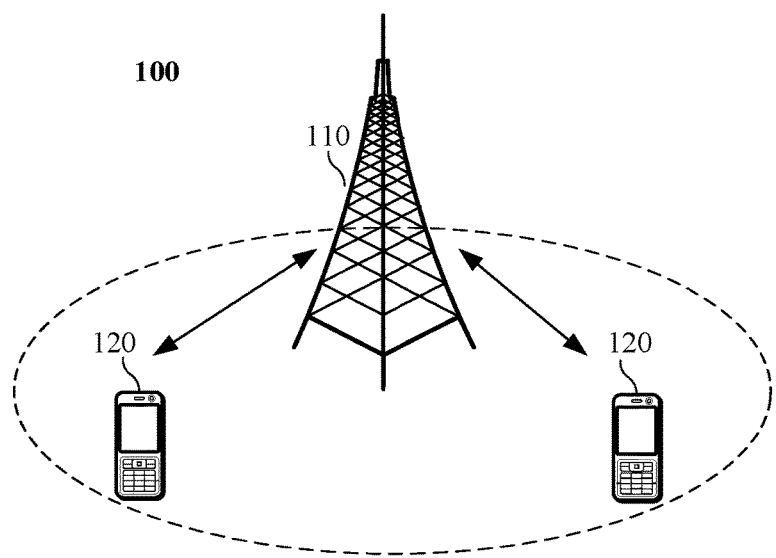

FIG. 1

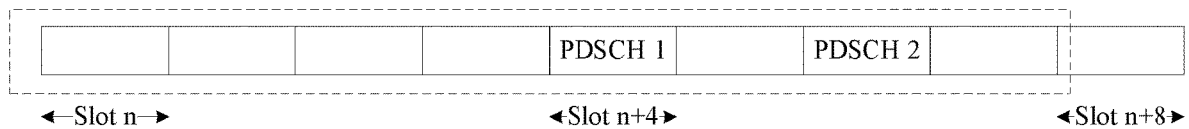

Receiving, by the terminal device, trigger signaling which is used for triggering transmission of feedback information for at least one downlink channel group by the terminal device ⟿ S210

Determining, by the terminal device based on the trigger signaling, a feedback information codebook which includes the feedback information for the at least one downlink channel group ⟿ S220

> Receiving, by the terminal device, trigger signaling which is used for triggering transmission of feedback information for at least one downlink transmission by the terminal device and which is used for indicating a total number of bits of feedback information to be transmitted, where the feedback information to be transmitted includes the feedback information for the at least one downlink transmission ~ S310

> Transmitting, by the network device, trigger signaling which is used for triggering transmission of feedback information for at least one downlink channel group by a terminal device and which is used by the terminal device to determine a feedback information codebook which includes the feedback information for the at least one downlink channel group ~ S410

> Transmitting, by the network device, trigger signaling which is used for triggering transmission of feedback information for at least one downlink transmission by a terminal device and which is used for indicating a total number of bits of feedback information to be transmitted, where the feedback information to be transmitted includes the feedback information for the at least one downlink transmission ~ S510

FIG. 7

METHOD FOR TRANSMITTING FEEDBACK INFORMATION, TERMINAL DEVICE, AND NETWORK DEVICE

CROSS-REFERENCE TO RELATED APPLICATIONS

The present application is a continuation of U.S. application Ser. No. 16/995,802, filed on Aug. 17, 2020, which is a continuation of International Application No. PCT/CN2019/071466, filed on Jan. 11, 2019, both of which are hereby incorporated by reference in their entireties.

BACKGROUND

The present disclosure relates to the field of communications, and in particular to a method for transmitting feedback information, a terminal device, and a network device.

With the development of wireless communication technologies, both LTE systems and NR systems will consider deploying networks on unlicensed spectrum to utilize unlicensed spectrum for data service transmission.

In NR Release 15 (Rel-15), dynamically determining Hybrid Automatic Repeat reQuest (HARQ) feedback timing (HARQ-timing) is supported. In addition, the NR Rel-15 system also supports multiplexed transmission of feedback information, such as ACK/NACK, that is, ACK/NACK information corresponding to multiple PDSCHs is transmitted through one channel. For ACK/NACK multiplexed transmission, two ACK/NACK information generation methods are further supported: semi-static ACK/NACK codebook (semi-static HARQ-ACK codebook) and dynamic ACK/NACK codebook (dynamic HARQ-ACK codebook). No matter which ACK/NACK information generation method is employed, it needs to be determined based on a feedback timing set.

For NR-based Access to Unlicensed Spectrum (NR-U) for Rel-16, it supports introducing a HARQ timing value of infinity in downlink control signaling, which indicates that the transmission time and resources of the ACK/NACK feedback information corresponding to a Physical Downlink Shared Channel (PDSCH) scheduled by Downlink Control Signaling (DCI) cannot be determined temporarily, and the ACK/NACK codebook determination method in Rel-15 needs to be determined based on the feedback timing set. Therefore, in the case where the HARQ timing includes the value of infinity, the existing Rel-15 scheme cannot be reused.

Therefore, in the NR-U design of Rel-16, how to transmit feedback information on the unlicensed spectrum has not yet been determined.

SUMMARY

A method for transmitting feedback information, a terminal device and a network device provided in the embodiments of the present disclosure can efficiently reduce redundant information in the feedback information.

In a first aspect, there is provided a method for transmitting feedback information, including: receiving, by a terminal device, trigger signaling which is used for triggering transmission of feedback information for at least one downlink channel group by the terminal device; and determining, by the terminal device based on the trigger signaling, a feedback information codebook which includes the feedback information for the at least one downlink channel group.

In a second aspect, there is provided a method for transmitting feedback information, including: receiving, by a terminal device, trigger signaling which is used for triggering transmission of feedback information for at least one downlink transmission channel and/or downlink transmission resource by the terminal device and which is used for indicating a total number of bits of feedback information to be transmitted, wherein the feedback information to be transmitted includes the feedback information for the at least one downlink transmission channel and/or downlink transmission resource.

In a third aspect, there is provided a method for indicating channel group information, including: receiving, by a terminal device, downlink control information DCI, wherein if a feedback timing information field in the DCI indicates a predetermined value, a Physical Uplink Control CHannel (PUCCH) resource indication information field in the DCI is used for indicating group information of a downlink channel corresponding to the DCI.

In a fourth aspect, there is provided a method for transmitting feedback information, including: transmitting, by a network device, trigger signaling which is used for triggering transmission of feedback information for at least one downlink channel group by a terminal device, and which is used by the terminal device to determine a feedback information codebook, wherein the feedback information codebook includes the feedback information for the at least one downlink channel group.

In a fifth aspect, there is provided a method for transmitting feedback information, including: transmitting, by a network device, trigger signaling which is used for triggering transmission of feedback information for at least one downlink transmission channel and/or downlink transmission resource by a terminal device and which is used for indicating a total number of bits of feedback information to be transmitted, wherein the feedback information to be transmitted includes the feedback information for the at least one downlink transmission channel and/or downlink transmission resource.

In a sixth aspect, there is provided a method for channel grouping, including: transmitting, by a network device, downlink control information DCI, wherein if a feedback timing information field in the DCI indicates a predetermined value, a physical uplink control channel PUCCH resource indication information field in the DCI is used for indicating group information of a downlink channel corresponding to the DCI.

In a seventh aspect, there is provided a terminal device configured to perform the method according to any one of the first to third aspects or in the implementations thereof. In specific, the terminal device includes functional modules for performing the method according to any one of the first to third aspects or in the implementations thereof.

In an eighth aspect, there is provided a network device configured to perform the method according to any one of the fourth to sixth aspects or in the implementations thereof. In specific, the terminal device includes functional modules for performing the method according to any one of the fourth to sixth aspects or in the implementations thereof.

In a ninth aspect, there is provided a terminal device including a processor and a memory which is configured to store a computer program, wherein the processor is configured to invoke and execute the computer program stored in the memory to perform the method according to any one of the first to third aspects or in the implementations thereof.

In a tenth aspect, there is provided a network device including a processor and a memory which is configured to store a computer program, wherein the processor is configured to invoke and execute the computer program stored in the memory to perform the method according to any one of the fourth to sixth aspects or in the implementations thereof.

In an eleventh aspect, there is provided a chip for implementing the method according to any one of the first to sixth aspects or in the implementations thereof. In specific, the chip includes a processor for invoking and executing a computer program from a memory to cause a device provided with the chip to perform the method according to any one of the first to sixth aspects or in the implementations thereof.

In a twelfth aspect, there is provided a computer-readable storage medium for storing a computer program that causes a computer to perform the method according to any one of the first to sixth aspects or in the implementations thereof.

In a thirteenth aspect, there is provided a computer program product including computer program instructions that cause a computer to perform the method according to any one of the first to sixth aspects or in the implementations thereof.

In a fourteenth aspect, there is provided a computer program that causes a computer to perform the method according to any one of the first to sixth aspects or in the implementations thereof.

In a fifteenth aspect, there is provided a method for transmitting feedback information, including: receiving, by a terminal device, trigger signaling used for triggering transmission of feedback information for a plurality of downlink channel groups by the terminal device, wherein the plurality of downlink channel groups include a first downlink channel group and a second downlink channel group, and a group number of the first downlink channel group is smaller than a group number of the second downlink channel group; and generating, by the terminal device based on the trigger signaling, a feedback codebook including the feedback information for the plurality of downlink channel groups, wherein the feedback information corresponding to the second downlink channel group is appended to the feedback information corresponding to the first downlink channel group in the feedback codebook.

In a sixteenth aspect, there is provided a terminal device including: a memory; a transceiver configured to receive trigger signaling used for triggering transmission of feedback information for a plurality of downlink channel groups by the terminal device, wherein the plurality of downlink channel groups include a first downlink channel group and a second downlink channel group, and a group number of the first downlink channel group is smaller than a group number of the second downlink channel group; and a processor configured to generate a feedback codebook including the feedback information for the plurality of downlink channel groups based on the trigger signaling, wherein the feedback information corresponding to the second downlink channel group is appended to the feedback information corresponding to the first downlink channel group in the feedback codebook.

In a seventeenth aspect, there is provided a method for transmitting feedback information, including: transmitting, by a network device, trigger signaling which is used for triggering transmission of feedback information for a plurality of downlink channel groups by a terminal device and which is used by the terminal device to determine a feedback codebook, wherein the feedback codebook includes the feedback information for the plurality of downlink channel groups, the plurality of downlink channel groups include a first downlink channel group and a second downlink channel group, a group number of the first downlink channel group is smaller than a group number of the second downlink channel group, and the feedback information corresponding to the second downlink channel group is appended to the feedback information corresponding to the first downlink channel group in the feedback codebook

BRIEF DESCRIPTION OF THE DRAWINGS

FIG. 1 is a schematic diagram of a communication system architecture according to an embodiment of the present disclosure.

FIG. 2 is a schematic diagram of PDSCH transmission according to an embodiment of the present disclosure.

FIG. 3 is a schematic diagram of a method for transmitting feedback information according to an embodiment of the present disclosure.

FIG. 5 is a schematic diagram of another method for transmitting feedback information according to an embodiment of the present disclosure.

FIG. 6 is a schematic diagram of still another method for transmitting feedback information according to an embodiment of the present disclosure.

FIG. 7 is a schematic diagram of still another method for transmitting feedback information according to an embodiment of the present disclosure.

DETAILED DESCRIPTION

Figure 4:
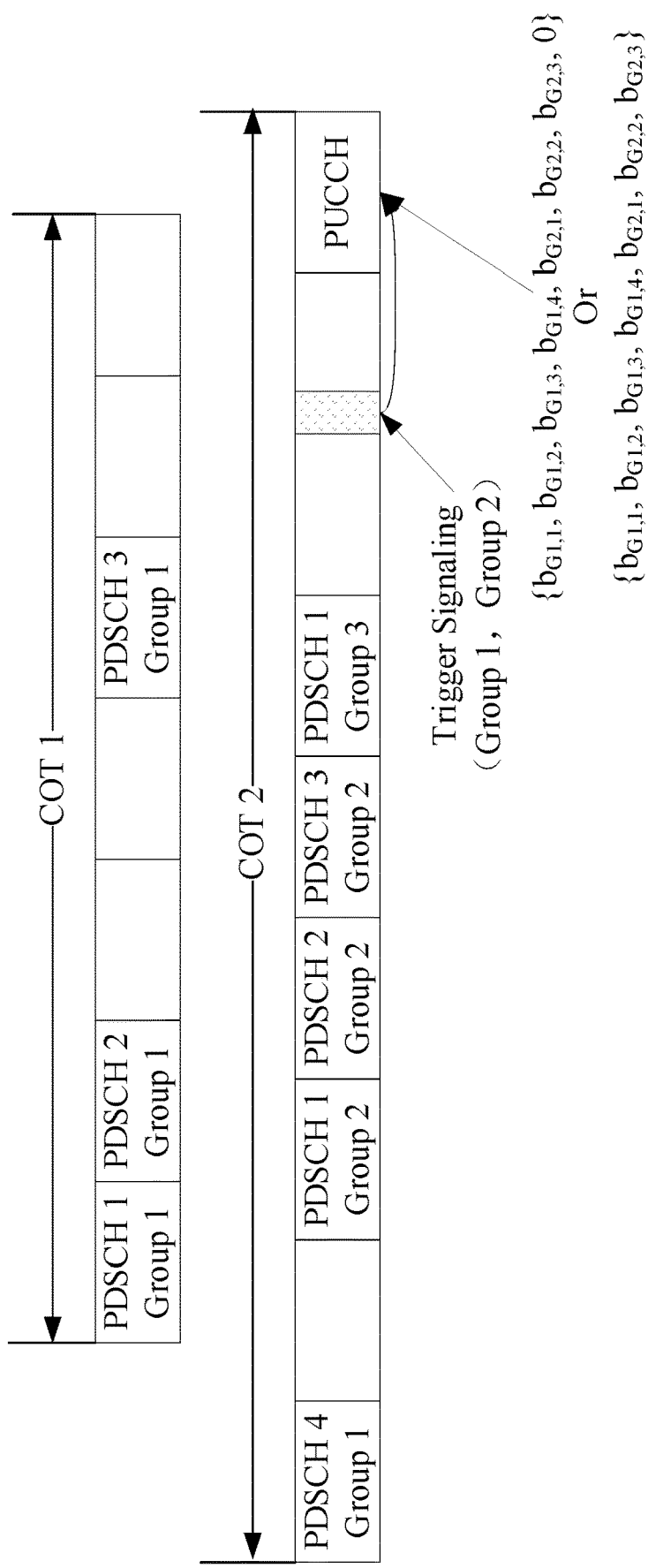
FIG. 4 is a schematic diagram of downlink channel and feedback information transmission according to an embodiment of the present disclosure.

The technical solutions in the embodiments of the present disclosure will be described below in connection with the drawings in the embodiments of the present disclosure. Obviously, the described embodiments are part of the embodiments of the present disclosure, but not all the embodiments. Based on the embodiments in the present disclosure, all other embodiments obtained by a person of ordinary skill in the art without creative work fall within the protection scope of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Global Interoperability for Microwave Access (WiMAX) communication system, a 5G system, or the like.

By way of example, a communication system 100 employed in the embodiments of the present disclosure is shown in FIG. 1. The communication system 100 can include a network device 110, which can be a device that communicates with a terminal device 120 (or referred to as a communication terminal or a terminal). The network device 110 can provide communication coverage for a specific geographic area and can communicate with terminal devices located within the coverage area. Optionally, the network device 110 may be a base station (Base Transceiver Station, BTS) in a GSM system or a CDMA system, a base station (NodeB, NB) in a WCDMA system, an evolutional base station in an LTE system (Evolutional Node B, eNB or eNodeB), or a wireless controller in Cloud Radio Access Network (CRAN), or the network device can be a mobile switching center, a relay station, an access point, an on-board device, a wearable device, a hub, a switch, a bridge, a router, a network device in 5G network or network devices in future public land mobile network (PLMN), etc.

The communication system 100 also includes at least one terminal device 120 located within the coverage of the network device 110. As used herein, the "terminal device" includes, but is not limited to, a device connected via wired lines, such as a Public Switched Telephone Networks (PSTN), a Digital Subscriber Line (DSL), a digital cable or direct cable connection; another data connection/network; wireless interfaces, such as those for cellular networks, a wireless local area network (WLAN), a digital TV network such as DVB-H network, satellite network, an AM-FM broadcast transmitter; a means of another terminal device configured to receive/transmit communication signals; and/or Internet of Things (IoT) devices. A terminal device configured to communicate through a wireless interface may be referred to as a "wireless communication terminal," "wireless terminal," or "mobile terminal." Examples of the mobile terminal include but are not limited to a satellite or cellular phone; a personal communication system (PCS) terminal that can incorporate data processing, facsimile, and data communication capabilities in a cellular radio telephone; a PDA that can include a radio telephone, a pager, Internet/internal network access, a web browser, a notepad, a calendar, and/or a Global Positioning System (GPS) receiver; and a conventional laptop and/or palm-type receiver or other electronic devices including a radio telephone transceiver. The terminal device may refer to an access terminal, User Equipment (UE), a subscriber unit, a user station, a moving station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant, PDA), a handheld device with a wireless communication function, a computing device or other processing devices connected to a wireless modem, an on-board device, a wearable device, a terminal device in a 5G network, a terminal device in a future evolved PLMN, or the like.

Optionally, Device to Device (D2D) communication can be performed between the terminal devices 120.

Alternatively, the 5G system or 5G network may also be referred to as a New Radio (NR) system or NR network.

FIG. 1 illustrates a network device and two terminal devices. Alternatively, the communication system 100 may include a plurality of network devices, and a different number of terminal devices may be included within the coverage area of each of the network devices, which is not limited in the embodiments of the present disclosure.

Optionally, the communication system 100 can further include other network entities such as a network controller and a mobility management entity, which is not limited in the embodiments of the present disclosure.

It should be understood that the devices with the communication function in the network/system in the embodiments of the present disclosure can be referred to as a communication device. For instance, in the communication system 100 shown in FIG. 1, the communication device can include the network device 110 and the terminal device 120 which have the communication function, and the network device 110 and the terminal device 120 can be any of the specific devices described above, which will not be repeated here. The communication device can also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The unlicensed spectrum is a spectrum allocated by countries and regions which is available for radio equipment communication. This spectrum is generally considered to be a shared spectrum. That is, communication devices in different communication systems can use this spectrum if they meet regulatory requirements specified by the countries or regions on the spectrum, and there is no need to apply to the government for a proprietary spectrum license. In order to allow various communication systems that use the unlicensed spectrum for wireless communication to coexist amicably on this spectrum, some countries or regions have stipulated the regulatory requirements that must be met when using the unlicensed spectrum. For example, in some regions, the communication device follows a "first listening and then speaking" principle, that is, the communication device needs to perform a channel listening before transmitting a signal on a channel of the unlicensed spectrum, and can perform signal transmission only when a result of the channel listening indicates an idle channel. If the channel listening result of the communication device on the channel of the unlicensed spectrum indicates that the channel is busy, the communication device cannot perform the signal transmission. In order to ensure fairness, the duration of the signal transmission by the communication device using the channel of the unlicensed spectrum in a transmission process cannot exceed a Maximum Channel Occupation Time (MCOT).

With the development of wireless communication technologies, both LTE systems and NR systems will consider deploying networks on the unlicensed spectrum to perform data service transmission by using the unlicensed spectrum.

In NR Release 15 (Rel-15), dynamically determining a HARQ feedback timing (HARQ-timing) is supported. The terminal device first determines a pre-configured HARQ timing set, and the base station indicates a value k in the HARQ timing by using Downlink Control Information (DCI). If a Physical Downlink Shared Channel (PDSCH) scheduled by the DCI is transmitted in a slot n, corresponding acknowledgment/non-acknowledgment (ACK/NACK) information is transmitted in a slot n+k. The pre-configured HARQ-timing set can include up to eight values. For different DCI formats, the eight values can be different. For example, for DCI format 1_0, the set is agreed by the protocol, and for DCI format 1_1, the set can be configured by the base station.

In addition, the NR Rel-15 system also supports ACK/NACK multiplexed transmission, that is, ACK/NACK information corresponding to multiple PDSCHs is transmitted through one channel. For ACK/NACK multiplexed transmission, two ACK/NACK information generation methods are further supported: a semi-static ACK/NACK codebook (semi-static HARQ-ACK codebook) and a dynamic ACK/NACK codebook (dynamic HARQ-ACK codebook).

The semi-static ACK/NACK codebook is determined based on elements in the pre-configured feedback timing set. Since the feedback timing set is agreed by the protocol or configured semi-statically in high levels, the number of ACK/NACK bits included in the ACK/NACK codebook will not change in accordance with an actual scheduling situation. The advantage of this solution is that there will be no ambiguity in understanding the number of bits of feedback information and a mapping relationship between the base station and the UE. However, the disadvantage is that the feedback overhead is large, and even if only a small number of PDSCHs are scheduled, a complete ACK/NACK codebook should be transmitted, which may contain a large amount of redundant information. For example, as shown in FIG. 2, in the case of single-carrier and single-codeword transmission, assuming that the value of the HARQ-timing set indicated in DCI is 8, the number of elements in the pre-configured feedback timing set is 8, and the pre-configured feedback timing set is $\{1, 2, 3, 4, 5, 6, 7, 8\}$, the number of ACK/NACK bits is also 8. Actually, however, as shown in FIG. 2, only two PDSCHs are transmitted. That is, there are 6 bits of redundant information.

The dynamic ACK/NACK codebook mainly solves the problem of feedback overhead, that is, in the downlink slot corresponding to the feedback time set, the number of bits of the ACK/NACK information is determined based on the number of the PDSCHs which are actually scheduled. The specific DCI which schedules the PDSCH transmission introduces a Downlink Assignment Index (DAI) information field to indicate a total number of PDSCHs that have been scheduled up to a currently scheduled PDSCH. For example, in FIG. 2, in the case of the single-carrier and single-codeword transmission, the terminal device receives two PDSCHs, PDSCH 1 and PDSCH 2, and in this case, the terminal device only needs to feedback 2-bit information. The disadvantage of this method is that when the terminal device does not receive part of the PDSCHs transmitted by the base station, such as the last PDSCH 2 in FIG. 2, there is a problem that the base station and the UE are of inconsistent understandings in the number of the PDSCHs actually scheduled, resulting in an inconsistent understanding in the number of bits of the feedback information.

For the NR-U in Rel-16, currently, how to transmit the feedback information on the unlicensed spectrum has not yet been determined. For example, NR-U supports the introduction of a case where the HARQ-timing value is infinite in the downlink control signaling. This value indicates that the transmission time and resources of the ACK/NACK feedback information corresponding to the PDSCH scheduled by the DCI cannot be determined temporarily, and the ACK/NACK codebook determination method in Rel-15 needs to be determined based on the feedback timing set. Therefore, in the case where the infinite HARQ timing value is included, the existing Rel-15 scheme cannot be reused.

Therefore, the embodiments of the present disclosure provide a method for transmitting feedback information in which the terminal device determines the ACK/NACK codebook based on an indication of trigger signaling, which can effectively reduce redundant information in the feedback information.

FIG. 3 is a schematic flowchart of a method 200 for transmitting feedback information according to an embodiment of the present disclosure. The method 200 can be performed by a terminal device. For example, the terminal device can be the terminal device 120 shown in FIG. 1. As shown in FIG. 3, the method 200 includes S210, receiving, by the terminal device, trigger signaling which is used for triggering transmission of feedback information for at least one downlink channel group by the terminal device; S220, determining, by the terminal device based on the trigger signaling, a feedback information codebook which includes the feedback information for the at least one downlink channel group. The above trigger signaling can be transmitted to the terminal device 120 by the network device 110 shown in FIG. 1.

It should be understood that the embodiments of the present disclosure can be applied to unlicensed spectrum, or to licensed spectrum, and the embodiments of the present disclosure are not limited thereto.

In the embodiments of the present disclosure, prior to S210, the method 200 can further include: receiving, by the terminal device, a downlink channel transmitted by the network device, where the downlink channel can include a downlink physical shared channel and/or a downlink physical control channel. Specifically, the network device transmits information of at least one downlink channel to the terminal device, and the terminal device may receive the information of some or all of the downlink channels in the at least one downlink channel, or may not receive any information of the at least one downlink channel.

In S210, the terminal device receives the trigger signaling transmitted by the network device, and the trigger signaling can be configured to instruct the terminal device to transmit the feedback information of the at least one downlink channel group, where the at least one downlink channel group belongs to the at least one downlink channel transmitted by the network device. Specifically, the trigger signaling can include a group indication of the at least one downlink channel group, so that the terminal device determines the at least one downlink channel group for which the feedback information needs to be transmitted. Alternatively, the feedback information in the embodiments of the present disclosure can be ACK/NACK information, which indicates whether the corresponding downlink channel information is successfully received by the terminal device or not, and the embodiments of the present disclosure are not limited thereto.

It should be understood that the method 200 can further include: determining, by the terminal device, downlink channel group information corresponding to the received downlink channel, where the received downlink channel may be any downlink channel received by the terminal device. For example, the received downlink channel may be any downlink channel in the at least one downlink channel group indicated by the trigger signaling. Specifically, the terminal device can determine the downlink channel group information corresponding to the received downlink channel in various ways. For example, the terminal device can determine the downlink channel group information corresponding to the downlink channel based on a Channel Occupation Time (COT) for the received downlink channel or the DCI corresponding to the downlink channel.

Optionally, in an embodiment, determining the downlink channel group information corresponding to the received downlink channel by the terminal device can include determining by the terminal device the corresponding downlink channel group information based on the COT for the received downlink channel, where the downlink channel group information corresponding to the downlink channel can be an identification of the COT for the downlink channel. For example, the terminal device can determine the downlink channels in the same COT to belong to the same downlink channel group. As another example, the terminal device can also determine the downlink channels in multiple COTs to belong to the same downlink channel group, and the embodiments of the present disclosure are not limited thereto.

Optionally, in another embodiment, determining the downlink channel group information corresponding to the received downlink channel by the terminal device can further include: receiving by the terminal device the downlink control information DCI corresponding to the downlink channel, where a Physical Downlink Control CHannel (PUCCH) resource indicator information field in the DCI is used for indicating the corresponding downlink channel group information if a feedback timing information field in the DCI indicates a predetermined value. Specifically, if the feedback timing information field in the DCI indicates the predetermined value, it indicates that the transmission time of the feedback information corresponding to the downlink channel is undetermined. Alternatively, if the feedback timing information field in the DCI indicates the predetermined value, it indicates that the transmission time of the feedback information can be determined by other information, for example, by first information which is used for triggering transmission of the feedback information of the downlink channel by the terminal device. For example, the first information can be the trigger signaling described above.

Optionally, the predetermined value can be infinity, or the predetermined value can represent infinity.

It should be understood that the downlink channel can include a physical downlink control channel carrying the DCI or a physical downlink shared channel scheduled by the DCI.

Conversely, if the feedback timing information field in the DCI does not indicate the predetermined value, the PUCCH resource indicator information field may not be used for indicating the downlink channel group information corresponding to the downlink channel. For example, the PUCCH resource indicator information field can be used to determine the transmission resource of the feedback information of the downlink channel.

It should be understood that the above method for determining the downlink channel group information corresponding to the downlink channel received by the terminal device can be used in any application scenario where the terminal device needs to determine the downlink channel group corresponding to the downlink channel, and is not limited to be applied to the trigger signaling in the method 200 of the present disclosure, and the embodiments of the present disclosure are not limited thereto.

In S220, the terminal device determines the feedback information codebook based on the trigger signaling. The feedback information codebook includes the feedback information for the at least one downlink channel group indicated in the trigger signaling. Specifically, determining the feedback information codebook by the terminal device includes determining by the terminal device the number of bits of the feedback information; and/or, determining by the terminal device a bit position of the feedback information of each downlink channel in the at least one downlink channel group.

In the embodiments of the present disclosure, the terminal device can determine the number of bits of the feedback information for the at least one downlink channel group and/or the bit position of the feedback information for each downlink channel group in various ways. A detailed description will be provided below in connection with several specific embodiments.

Optionally, in an embodiment, the number of downlink channels in one downlink channel group can be pre-configured, or the number of bits of feedback information for one downlink channel group can be pre-configured, and then the terminal device can determine the number of bits of the feedback information based on this pre-configured number and the number of groups of the at least one downlink channel group.

Specifically, if the number of downlink channels included in each downlink channel group in the at least one downlink channel group is pre-configured, and for example, the pre-configured value can be a maximum number of downlink channels that can be included in each downlink channel group, the terminal device can determine the number of bits of the feedback information based on the pre-configured value, the number of bits of feedback information corresponding to each downlink channel and the number of groups of the at least one downlink channel group. Alternatively, the terminal device can determine the number of the bits of the feedback information corresponding to each downlink channel group based on the pre-configured value and the number of the bits of the feedback information corresponding to each downlink channel, and then determine the number of bits of the feedback information based on the number of bits of the feedback information corresponding to each downlink channel group and the number of groups of the at least one downlink channel group. The number of bits of the feedback information corresponding to each downlink channel can also be a preset value, and the numbers of bits of the feedback information corresponding to different downlink channels can be the same or different. In addition, since the number of downlink channels included in each downlink channel group is pre-configured, the pre-configured value can be the same as or different from the number of channels which are actually transmitted. For example, the pre-configured value can represent the maximum number of downlink channels that can be included in each downlink channel group, and in actual transmission, the number of downlink channels included in any downlink channel group may be less than or equal to this pre-configured value.

Alternatively, if the number of bits of the feedback information corresponding to each downlink channel group in the at least one downlink channel group can be pre-configured, the terminal device can determine the number of bits of the feedback information based on the number of bits of the feedback information corresponding to each downlink channel group and the number of groups of the at least one downlink channel groups, where the number of bits of the feedback information corresponding to each downlink channel group can be the same, for example, the number of bits of the feedback information corresponding to each downlink channel group is equal to the maximum number of bits of the feedback information corresponding to one downlink channel group, or the number of bits of the feedback information corresponding to each downlink channel group can be different, and the embodiments of the present disclosure are not limited thereto.

For example, as shown in FIG. 4, a description will be provided in an example where the downlink channel is PDSCH, and the feedback information is ACK/NACK information. Assuming a single-codeword transmission mode, that is, one PDSCH carries one codeword, correspondingly, there is one-bit ACK/NACK information. Each PDSCH group is pre-configured to include up to 4 PDSCHs, and then each PDSCH group corresponds to a maximum of 4 bits of ACK/NACK information. As shown in FIG. 4, the network device transmits 3 PDSCH groups to the terminal device in COT1 and COT2, where PDSCH group 1 includes 4 PDSCHs, labeled as PDSCH1 to PDSCH 4 respectively; PDSCH group 2 includes 3 PDSCHs, labeled as PDSCH1 to PDSCH3 respectively; and PDSCH group 3 includes one PDSCH, labeled as PDSCH1.

Assuming that the network device transmits the trigger signaling to instruct the terminal device to transmit the ACK/NACK feedback information corresponding to PDSCH group 1 and PDSCH group 2 in the last slot of COT2, based on that each PDSCH group includes at most 4 PDSCHs and one PDSCH corresponds to 1 bit of ACK/NACK information, the terminal device can determine that the number of bits of the ACK/NACK information corresponding to each PDSCH group is 4, and the number of bits of the ACK/NACK information corresponding to the two PDSCH groups that are to be transmitted is 4*2=8 bits.

The feedback information corresponding to PDSCH group 1 can be mapped to first 4 bits of the 8 bits, and the feedback information corresponding to PDSCH group 2 can be mapped to the last 4 bits. Alternatively, if a feedback order of the PDSCH groups indicated in the trigger signaling is PDSCH group 2 first, and then PDSCH group 1, the feedback information corresponding to PDSCH group 1 can also be mapped to the last 4 bits of the 8 bits, and the feedback information corresponding to PDSCH group 2 can be mapped to the first 4 bits.

In addition, the order of feedback information corresponding to each of the PDSCHs in each PDSCH group can be determined based on the transmission time sequence or reception time sequence of each PDSCH, or can also be determined based on an identification or a number of each PDSCH. For example, the feedback information can be sequentially mapped based on the DAI value corresponding to each PDSCH. The DAI values can be determined by using a counter-DAI method. That is, the DAI value corresponding to PDSCH1 is 1, the DAI value corresponding to PDSCH 2 is 2, and so on. If the total number of the scheduled PDSCHs is less than 4, placeholder information is set at the end of the corresponding 4 bits.

In summary, in this embodiment, the ACK/NACK information to be transmitted for the PDSCH groups shown in FIG. 4 can be $\{b_{G1,1}, b_{G1,2}, b_{G1,3}, b_{G1,4}, b_{G2,1}, b_{G2,2}, b_{G2,3}, 0\}$, where $b_{G1,1}$ represents the ACK/NACK information corresponding to PDSCH 1 in PDSCH group 1, and so on, and 0 is the placeholder information.

Although the feedback information determined in the above pre-configured manner may still have some redundant information, the redundant information can be effectively avoided through proper scheduling by the network device. That is, when there are multiple downlink channels, it should try to ensure that the downlink channels allocated in each downlink channel group reach or approach the upper limit of the maximum number as much as possible.

Optionally, in another embodiment, the number of downlink channels included in each downlink channel group or the number of bits of the feedback information in each downlink channel group can also be indicated by the trigger signaling, that is, the trigger signaling received by the terminal device can also be used for indicating the number of bits of the feedback information corresponding to each downlink channel group, or to indicate the number of downlink channels included in each downlink channel group, so that the terminal device determines the number of bits of the feedback information for the at least one downlink channel group based on the trigger signaling, or the terminal device determines the number of bits of the feedback information corresponding to each downlink channel group based on the trigger signaling, and then determines the number of bits of the feedback information for the at least one downlink channel group based on the number of bits of the feedback information corresponding to each downlink channel group and the number of the downlink channel groups.

Specifically, if the trigger signaling indicates the number of downlink channels included in each downlink channel group, the terminal device can determine the number of bits of the feedback information for the at least one downlink channel group based on the number of downlink channels included in each downlink channel group, the number of bits of the feedback information corresponding to each downlink channel, and the number of groups of the at least one downlink channel group; or the terminal device can determine the number of bits of the feedback information corresponding to a first downlink channel group in the at least one downlink channel group based on the number of downlink channels included in the first downlink channel group and the number of bits of the feedback information corresponding to each downlink channel so as to determine the number of bits of the feedback information corresponding to each downlink channel group in at least one downlink channel group, and can determine the number of bits of the feedback information for the at least one downlink channel group by summing up the feedback information corresponding to all the downlink channel groups in the at least one downlink channel group. The numbers of downlink channels included in different downlink channel groups indicated in the trigger signaling may be the same or different. In addition, the number of bits of the feedback information corresponding to each downlink channel here can be pre-configured, for example, the pre-configured value can represent the maximum number of bits of the feedback information corresponding to each downlink channel, and the number of bits of the feedback information corresponding to each downlink channel can be the same or different.

Alternatively, if the trigger signaling indicates the number of bits of the feedback information corresponding to each downlink channel group in the at least one downlink channel group, the terminal device can determine the number of bits of the feedback information for the at least one downlink channel group by summing up the feedback information corresponding to all the downlink channel groups in the at least one downlink channel group. The numbers of bits of the feedback information corresponding to different downlink channel groups indicated in the trigger signaling can be the same or different.

For example, as shown in FIG. 4, the description will be made still in the example where the downlink channel is PDSCH, and the feedback information thereof is ACK/NACK information. Assuming the single-codeword transmission mode, that is, one PDSCH carries one codeword and corresponds to one-bit ACK/NACK information. Taking FIG. 4 as an example, the specific distribution of the PDSCH groups is as shown in FIG. 4 and will not be repeated here.

The network device transmits the trigger signaling to instruct the terminal device to transmit ACK/NACK feedback information corresponding to PDSCH group 1 and PDSCH group 2 in the last slot of COT 2. In addition, the trigger signaling further indicates that PDSCH group 1 includes 4 PDSCHs, and PDSCH group 2 includes 3 PDSCHs. Then, based on that one PDSCH carries one codeword and corresponds to one-bit of ACK/NACK information and based on the number of PDSCHs included in the PDSCH groups indicated in the trigger signaling, the terminal device can determine that the number of ACK/NACK bits to be transmitted is 4+3=7 bits.

Similar to the previous embodiment, the order of the feedback information for the two PDSCH groups fed back by the terminal device and the order of the feedback information corresponding to the PDSCHs in each PDSCH group can be determined in accordance with the order of reception or transmission or in accordance with relevant indication information, for example, the trigger signaling; or can be determined based on the indication or number of each PDSCH, for example, based on the DAI of each PDSCH, and the embodiments of the present disclosure are not limited thereto.

In summary, in this embodiment, the ACK/NACK information to be transmitted for the PDSCH groups as shown in FIG. 4 can be $\{b_{G1,1}, b_{G1,2}, b_{G1,3}, b_{G1,4}, b_{G2,1}, b_{G2,2}, b_{G2,3}\}$, where $b_{G1,1}$ represents the ACK/NACK information corresponding to PDSCH 1 in PDSCH group 1, $b_{G1,2}$ represents the ACK/NACK information corresponding to PDSCH 2 in PDSCH group 1, and so on.

Therefore, the feedback information codebook determined in the above manner can effectively avoid the ambiguity in understanding of the actually transmitted downlink channels by the network device and the terminal device, and reduce the uplink control signaling overhead while ensuring the consistency in the understanding of transmission signaling, thereby improving the transmission performance of the uplink control signaling.

Optionally, in yet another embodiment, the number of downlink channels included in each downlink channel group or the number of bits of the feedback information corresponding to each downlink channel group can also be indicated by other information, for example, by downlink control signaling which schedules downlink channel transmission. Specifically, taking the first downlink channel group in the at least one downlink channel group as an example, the first downlink channel group is any downlink channel group in the at least one downlink channel group, and the terminal device can determine the number of downlink channels included in the first downlink channel group based on at least one piece of indication information corresponding to the first downlink channel Information, or can further determine the number of bits of the feedback information corresponding to the first downlink channel group.

Specifically, the terminal device can determine the number of downlink channels included in the first downlink channel group based on the at least one piece of indication information, and then determine the number of bits of the feedback information corresponding to the first downlink channel group based on the number of bits of the feedback information corresponding to each downlink channel, and similarly determine the number of bits of the feedback information corresponding to each downlink channel group in the at least one downlink channel group and sum them up, thereby determining the number of bits of the feedback information for the at least one downlink channel group.

For example, as shown in FIG. 4, the description will be made still in the example where the downlink channel is PDSCH, and the feedback information thereof is ACK/NACK information. Assuming the single-codeword transmission mode, that is, one PDSCH carries one codeword and corresponds to one-bit ACK/NACK information. Taking FIG. 4 as an example, the specific distribution of the PDSCH groups is as shown in FIG. 4 and will not be repeated here.

The network device transmits the trigger signaling to instruct the terminal device to transmit the ACK/NACK feedback information corresponding to PDSCH group 1 and PDSCH group 2 in the last slot of COT 2, and the terminal device can determine the number of bits of the feedback information corresponding to each PDSCH group based on the DCI which schedules the PDSCHs.

Specifically, the description is made here in an example where the number of PDSCHs in each PDSCH group is determined based on the DAI included in the DCI. There are generally two situations. In one method, a continuous counting method is used for the DAI, that is, the DAI value corresponding to PDSCH 1 is 1, the DAI value corresponding to PDSCH 2 is 2, and so on. For any PDSCH group, the terminal device can determine the number of PDSCHs included in the PDSCH group based on the DAI value of the PDSCH received last or the maximum value of the received DAI values. For example, for the PDSCH group 1 shown in FIG. 4, the last PDSCH received by the terminal device in the PDSCH group 1 is PDSCH4, the corresponding DAI value thereof is 4, and thus the terminal device can determine that the PDSCH group 1 includes 4 PDSCHs.

However, the disadvantage of determining the number of downlink channels included in the downlink channel group by using this method is the same as that of the existing dynamic HARQ-ACK codebook in the NR system. That is, the loss of the DCI corresponding to the last PDSCH will cause inconsistent understanding of the number of bits of the feedback information by the terminal device and the network device. However, the probability of DCI loss is very low, and the network device can correct the ambiguity of understanding caused by DCI loss through a certain amount of blind detection.

In another method, there can be two types of DAIS, and one can be referred to as a counter-DAI which can mark the PDSCHs in the PDSCH group by using the continuous counting method, for example, the first method described above; the other type can be referred to as a total DAI which can directly indicate the number of PDSCHs included in the group, and the terminal device can directly determine the number of PDSCHs included in the current PDSCH group based on the total DAI.

The terminal device can determine the number of bits of the ACK/NACK information that needs to be fed back for the PDSCH group 1 and the PDSCH group 2 to be 4+3=7 bits in any one of the above two methods.

Similar to the previous two embodiments, the order of the feedback information for the two PDSCH groups fed back by the terminal device and the order of the feedback information corresponding to the PDSCHs in each PDSCH group can be determined in accordance with the order of reception or transmission or based on relevant indication information, for example, the trigger signaling; or can be determined based on the indication or number of each PDSCH, for example, based on the DAI of each PDSCH, and the embodiments of the present disclosure are not limited thereto.

In summary, in this embodiment, the ACK/NACK information to be transmitted for the PDSCH groups as shown in FIG. 4 can be $\{b_{G1,1}, b_{G1,2}, b_{G1,3}, b_{G1,4}, b_{G2,2}, b_{G2,3}\}$, where $b_{G1,1}$ represents the ACK/NACK information corresponding to PDSCH 1 in PDSCH group 1, $b_{G1,2}$ represents ACK/NACK information corresponding to PDSCH 2 in PDSCH group 1, and so on.

Therefore, in the method for transmitting feedback information according to the embodiments of the present disclosure, the terminal device can determine the feedback information codebook including the feedback information for the at least one downlink channel group based on the trigger signaling transmitted by the network device, which can effectively reduce redundant information in the feedback information and can also effectively avoid the ambiguity in understanding the actually transmitted downlink channels by the network device and the terminal device, and reduce the uplink control signaling overhead while ensuring the consistent understanding of transmission signaling, thereby improving the transmission performance of the uplink control signaling.

Optionally, the embodiments of the present disclosure also provide a method 300 for transmitting feedback information in which the terminal device can also determine the ACK/NACK codebook based on an indication of the trigger signaling, which can effectively reduce redundant information in the feedback information.

FIG. 5 shows a schematic flowchart of the method 300 for transmitting feedback information according to the embodiments of the present disclosure. The method 300 can be performed by a terminal device. For example, the terminal device can be those shown in FIG. 1. As shown in FIG. 5, method 300 includes S310, receiving, by the terminal device, trigger signaling, which is used for triggering transmission of feedback information for at least one downlink transmission channel and/or downlink transmission resource by the terminal device. The trigger signaling can further include a total number of bits for indicating feedback information to be transmitted, where the feedback information to be transmitted includes the feedback information for the at least one downlink transmission channel and/or downlink transmission resource.

It should be understood that the embodiments of the present disclosure can be applied to unlicensed spectrum, or to licensed spectrum, and the embodiments of the present disclosure are not limited thereto.

In the embodiment of the present disclosure, prior to S310, the method 300 can further include receiving, by the terminal device, information of the downlink transmission channel and/or downlink transmission resource scheduled by the network device. Specifically, the network device transmits at least one downlink transmission to the terminal device, and the terminal device may receive some or all of the downlink transmissions in the at least one downlink transmission, or may not receive any of them.

In S310, the terminal device receives the trigger signaling and determines the total number of bits of the feedback information to be transmitted based on the trigger signaling, the feedback information to be transmitted includes the feedback information for the at least one downlink transmission channel and/or downlink transmission resource, and the at least one downlink transmission channel and/or downlink transmission resource is part or all of the downlink transmission channels and/or downlink transmission resources scheduled by the network device to be used by the terminal.

In the embodiment of the present disclosure, the trigger signaling can include a target value which can be used by the terminal device to determine at least one downlink transmission channel and/or downlink transmission resource. Specifically, the target value can be used for indicating a time range. For example, the time range can represent the number of slots, so that the terminal device determines the number of the at least one downlink transmission channel and/or downlink transmission resources included within this time range.

Specifically, the time range can be a time range relative to the trigger signaling. For example, the trigger signaling is used as a start timing or an end timing of the time range. Alternatively, the time range can also be a time range relative to a time at which the terminal device transmits the feedback information. For example, the start timing or the end timing of transmitting the feedback information to be transmitted can be used as the start timing or the end timing of the time range, and the embodiments of the present disclosure are not limited thereto.

Optionally, the target value can also be configured to directly indicate the number of the at least one downlink transmission channel and/or downlink transmission resource. Alternatively, it can also be used for indicating HARQ progress information corresponding to the at least one downlink transmission channel, and the terminal device determines the at least one downlink transmission channel and/or downlink transmission resource that needs to be feedback based on the HARQ progress information.

In the embodiment of the present disclosure, the terminal device can determine the number of the at least one downlink transmission channel and/or downlink transmission resource based on the target value in the trigger signaling, and then determine the total number of bits of the feedback information to be transmitted based on the number of bits of the feedback information corresponding to each downlink transmission channel and/or downlink transmission resource. The number of bits of the feedback information corresponding to each downlink transmission channel and/or downlink transmission resource can be a preset value, and this number of bits of the feedback information corresponding to each downlink transmission channel and/or downlink transmission resource can be the same, then a product of this same value and the number of the at least one downlink transmission channel and/or downlink transmission resource is the total number of bits of the feedback information to be transmitted. Alternatively, the number of bits of the feedback information corresponding to each downlink transmission channel and/or downlink transmission resource can also be different from each other, and the number of bits of the feedback information corresponding to each downlink transmission channel and/or downlink transmission resource can be determined separately, and by summing them up, the total number of bits of the feedback information corresponding to the at least one downlink transmission channel and/or downlink transmission resource channel can be determined.

Optionally, the target value included in the trigger signaling can also be configured to directly indicate the total number of bits of the feedback information to be transmitted, and the terminal device transmits the feedback information to be transmitted based on the trigger signaling.

Therefore, in the method for transmitting feedback information according to the embodiment of the present disclosure, the terminal device can determine the feedback information codebook including the feedback information for the at least one downlink transmission channel and/or downlink transmission resource based on the trigger signaling transmitted by the network device, which can effectively reduce the redundant information in the feedback information while ensuring the consistent understanding of the transmission signaling.

The two methods for transmitting feedback information in the embodiments of the present disclosure are described above in detail from the perspective of the terminal device in connection with FIGS. 1 to 5, respectively. Methods for transmitting feedback information according to the embodiments of the present disclosure will be described below from the perspective of the network device in connection with FIGS. 6 to 7.

FIG. 6 shows a schematic flowchart of a method 400 for transmitting feedback information according to an embodiment of the present disclosure. The method 400 can be performed by the network device such as those shown in FIG. 1. As shown in FIG. 6, method 400 includes: S410, transmitting, by the network device, trigger signaling, which is used for triggering transmission of feedback information for at least one downlink channel group by a terminal device. The triggering signaling is used by the terminal device to determine a feedback information codebook, which includes the feedback information for the at least one downlink channel group.

Optionally, in an embodiment, the trigger signaling includes a group indication of the at least one downlink channel group.

Optionally, in an embodiment, a downlink channel in the at least one downlink channel group includes a downlink physical shared channel and/or a downlink physical control channel.

Optionally, in an embodiment, the method 400 further includes transmitting, by the network device, at least one piece of indication information corresponding to a first downlink channel group in the at least one downlink channel group, where the at least one piece of indication information is used by the terminal device to determine the number of downlink channels included in the first downlink channel group.

Optionally, in an embodiment, the trigger signaling is also used for indicating the number of downlink channels included in the first downlink channel group in the at least one downlink channel group.

Optionally, in an embodiment, the method 400 further includes transmitting, by the network device, downlink control information DCI corresponding to a downlink channel in the at least one downlink channel group that is received by the terminal device, where, if a feedback timing information field in the DCI indicates a predetermined value, a physical uplink control channel PUCCH resource indication information field in the DCI is used for indicating downlink channel group information corresponding to the received downlink channel.

Therefore, in the method for transmitting feedback information according to the embodiments of the present disclosure, the network device transmits the trigger signaling, and the terminal device can determine the feedback information codebook including the feedback information for the at least one downlink channel group based on the trigger signaling, which can effectively reduce redundant information in the feedback information and can also effectively avoid the ambiguity in understanding the actually transmitted downlink channels by the network device and the terminal device, and reduce the uplink control signaling overhead while ensuring the consistent understanding of transmission signaling, thereby improving the transmission performance of the uplink control signaling.

FIG. 7 is a schematic flowchart of a method 500 for transmitting feedback information according to an embodiment of the present disclosure. The method 500 can be performed by a network device such as that shown in FIG. 1. As shown in FIG. 7, the method 500 includes: S510, transmitting, by the network device, trigger signaling which is used for triggering transmission of feedback information for at least one downlink transmission channel and/or downlink transmission resource by a terminal device and which is used for indicating a total number of bits of feedback information to be transmitted, where the feedback information to be transmitted includes the feedback information for the at least one downlink transmission channel and/or downlink transmission resource.

Optionally, in an embodiment, the trigger signaling includes a target value that is used by the terminal device to determine the at least one downlink transmission channel and/or downlink transmission resource.

Optionally, in an embodiment, the target value is used for indicating a time range that is used by the terminal device to determine the at least one downlink transmission channel and/or downlink transmission resource within the time range.

Optionally, in an embodiment, the target value is the number of the at least one downlink transmission channel and/or downlink transmission resource, or the target value is HARQ progress information corresponding to the at least one downlink transmission channel and/or downlink transmission resource.

Optionally, in an embodiment, the trigger signaling includes a target value, which is the total number of bits of the feedback information to be transmitted.

Therefore, in the method for transmitting feedback information according to the embodiment of the present disclosure, the network device transmits the trigger signaling, the terminal device can determine the feedback information codebook including the feedback information for the at least one downlink transmission channel and/or downlink transmission resource based on the trigger signaling, which can effectively reduce the redundant information in the feedback information while ensuring the consistent understanding of the transmission signaling.

It should be understood that in various embodiments of the present disclosure, the serial numbers of the above processes do not mean that the performing order thereof is sequential, and the performing order of the processes should be determined based on the functions and inherent logic thereof, which should not be construed as any limitation on implementation processes of the embodiments of the present disclosure.

In addition, the term "and/or" used herein is merely to describe a relative relationship of the related objects, indicating that there can be three relationships. For example, as for A and/or B, it can indicate three cases where A exists alone, A and B exist simultaneously, and B exists alone. In addition, the character "/" used herein generally indicates that the related objects before and after "/" are in an "or" relationship.

The methods for transmitting feedback information according to the embodiments of the present disclosure are described above in detail with reference to FIGS. 1 to 7, and the terminal device and the network device according to the embodiments of the present disclosure will be described below with reference to FIGS. 8 to 12.

Figure 8:
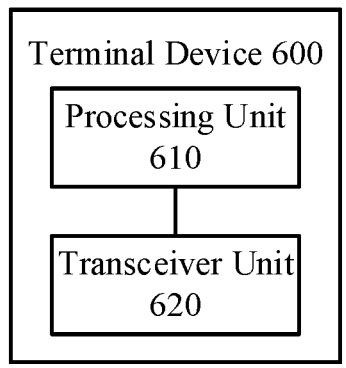
FIG. 8 is a schematic block diagram of a terminal device according to an embodiment of the present disclosure.

As shown in FIG. 8, a terminal device 600, according to the embodiment of the present disclosure, includes a processing unit 610 and a transceiver unit 620. Specifically, the terminal device 600 can be configured to perform the method 200 in the embodiment of the present disclosure. That is, the transceiver unit 620 is configured to receive trigger signaling which is used for triggering transmission of feedback information for at least one downlink channel group by the terminal device, and the processing unit 610 is configured to determine a feedback information codebook based on the trigger signaling, where the feedback information codebook includes the feedback information for the at least one downlink channel group.

Optionally, in an embodiment, the trigger signaling includes a group indication of the at least one downlink channel group.

Optionally, in an embodiment, a downlink channel in the at least one downlink channel group includes a downlink physical shared channel and/or a downlink physical control channel.

Optionally, in an embodiment, the processing unit 610 is configured to determine the number of bits of the feedback information and/or to determine a bit position of the feedback information for each downlink channel in the at least one downlink channel group.

Optionally, in an embodiment, the processing unit 610 is configured to determine the number of bits of the feedback information based on the number of bits of the feedback information corresponding to each downlink channel group in the at least one downlink channel group and the number of groups of the at least one downlink channel group.

Optionally, in an embodiment, the number of bits of the feedback information corresponding to each downlink channel group is pre-configured, or the trigger signaling is used for indicating the number of bits of the feedback information corresponding to each downlink channel group.

Optionally, in an embodiment, the processing unit 610 is configured to determine the number of bits of the feedback information for a first downlink channel group in the at least one downlink channel group based on the number of downlink channels included in the first downlink channel group.

Optionally, in an embodiment, the number of bits of the feedback information for each downlink channel group is determined based on a maximum number of downlink channels, where the maximum number of downlink channels represents a maximum number of downlink channels that can be included in each downlink channel group.

Optionally, in an embodiment, the transceiver unit 620 is configured to receive at least one piece of indication information corresponding to the first downlink channel group, and the processing unit 610 is configured to determine the number of downlink channels included in the first downlink channel group based on the at least one piece of indication information.

Optionally, in an embodiment, the trigger signaling is also used for indicating the number of downlink channels included in the first downlink channel group.

Optionally, in an embodiment, the maximum number of downlink channels is preset.

Optionally, in an embodiment, the processing unit 610 is configured to determine the number of bits of the feedback information based on a target parameter, the number of downlink channels included in each downlink channel group in the at least one downlink channel group, and the number of groups of the at least one downlink channel group, where a value of the target parameter is a maximum number of bits of the feedback information corresponding to each downlink channel in the at least one downlink channel group.

Optionally, in an embodiment, the processing unit 610 is configured to determine downlink channel group information corresponding to the received downlink channel, which is a downlink channel in the at least one downlink channel group.

Optionally, in an embodiment, the processing unit 610 is configured to determine the corresponding downlink channel group information based on a Channel Occupation Time (COT) for the received downlink channel.

Optionally, in an embodiment, the corresponding downlink channel group information is an indication of the COT for the received downlink channel.

Optionally, in an embodiment, the processing unit 610 is configured to receive downlink control information DCI corresponding to the received downlink channel, where, if a feedback timing information field in the DCI indicates a predetermined value, a physical uplink control channel PUCCH resource indication information field in the DCI is used for indicating the corresponding downlink channel group information.

It should be understood that the terminal device 600 according to the embodiment of the present disclosure can correspondingly perform the method 200 in the embodiments of the present disclosure, and the above-mentioned and other operations and/or functions of each unit in the terminal device 600 are respectively for implementing the corresponding process of the terminal device in the methods shown in FIGS. 1 to 4 and will not be repeated here for the sake of brevity.

Therefore, the terminal device according to the embodiments of the present disclosure can determine the feedback information codebook including the feedback information for the at least one downlink channel group based on the trigger signaling transmitted by the network device, which can effectively reduce redundant information in the feedback information and can also effectively avoid the ambiguity in understanding the actually transmitted downlink channels by the network device and the terminal device, and reduce the uplink control signaling overhead while ensuring the consistent understanding of transmission signaling, thereby improving the transmission performance of the uplink control signaling.

Optionally, the terminal device 600 can also be correspondingly configured to perform the method 300 in the embodiment of the present disclosure. That is, the transceiver unit 620 is configured to receive trigger signaling which is used for triggering transmission of feedback information for at least one downlink transmission channel and/or downlink transmission resource by the terminal device and which is used for indicating a total number of bits of feedback information to be transmitted, where the feedback information to be transmitted includes the feedback information for the at least one downlink transmission channel and/or downlink transmission resource.

Optionally, in an embodiment, the trigger signaling includes a target value, and the processing unit 610 is configured to determine the at least one downlink transmission channel and/or downlink transmission resource based on the target value.

Optionally, in an embodiment, the target value is used for indicating a time range, and the processing unit 610 is configured to determine the at least one downlink transmission channel and/or downlink transmission resource within the time range.

Optionally, in an embodiment, the target value is the number of the at least one downlink transmission channel and/or downlink transmission resource, or the target value is HARQ progress information corresponding to the at least one downlink transmission channel and/or downlink transmission resource.

Optionally, in an embodiment, the processing unit 610 is configured to determine the total number of bits of the feedback information to be transmitted based on the number of the at least one downlink transmission channel and/or downlink transmission resource.

Optionally, in an embodiment, the trigger signaling includes a target value, which is the total number of bits of the feedback information to be transmitted.

It should be understood that the terminal device 600 according to the embodiment of the present disclosure can be correspondingly configured to perform the method 300 in the embodiments of the present disclosure, and the above-mentioned and other operations and/or functions of each unit in the terminal device 600 are respectively for implementing the corresponding process of the terminal device in the methods shown in FIG. 5 and will not be repeated here for the sake of brevity.

Therefore, the terminal device according to the embodiment of the present disclosure can determine the feedback information codebook including the feedback information for the at least one downlink transmission channel and/or downlink transmission resource based on the trigger signaling transmitted by the network device, which can effectively reduce the redundant information in the feedback information while ensuring the consistent understanding of the transmission signaling.

Optionally, the terminal device 600 can also be correspondingly configured to perform the following. The transceiver unit 620 is configured to receive DCI, where, if a feedback timing information field in the DCI indicates a predetermined value, a PUCCH resource indication information field in the DCI is used for indicating the group information of the downlink channel corresponding to the DCI.

Optionally, in an embodiment, if the feedback timing information field in the DCI indicates the predetermined value, the transmission time of the feedback information corresponding to the downlink channel is undetermined; or, if the feedback timing information field in the DCI indicates the predetermined value, the transmission time of the feedback information is determined by first information which is used for triggering transmission of the feedback information by the terminal device.

Optionally, in an embodiment, the predetermined value is infinity.

Optionally, in an embodiment, the downlink channel includes a physical downlink control channel carrying the DCI or a physical downlink shared channel scheduled by the DCI.

Figure 9:
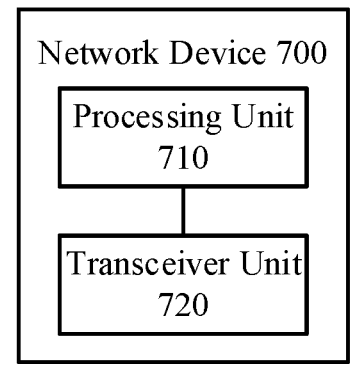
FIG. 9 is a schematic block diagram of a network device according to an embodiment of the present disclosure.

As shown in FIG. 9, a network device 700, according to an embodiment of the present disclosure includes a processing unit 710 and a transceiver unit 720. Specifically, the network device 700 can be correspondingly configured to perform method 400 in the embodiment of the present disclosure. That is, the transceiver unit 720 is configured to transmit trigger signaling generated by the processing unit 710, the trigger signaling being used for triggering transmission of feedback information for at least one downlink channel group by a terminal device and being configured to be used by the terminal device to determine a feedback information codebook which includes the feedback information for the at least one downlink channel group.

Optionally, in an embodiment, the trigger signaling includes a group indication of the at least one downlink channel group.

Optionally, in an embodiment, the downlink channel in the at least one downlink channel group includes a downlink physical shared channel and/or a downlink physical control channel.

Optionally, in an embodiment, the transceiver unit 720 is configured to transmit at least one piece of indication information corresponding to a first downlink channel group in the at least one downlink channel group, the at least one piece of indication information being used by the terminal device to determine the number of downlink channels included in the first downlink channel group.

Optionally, in an embodiment, the trigger signaling is also used for indicating the number of downlink channels included in the first downlink channel group in the at least one downlink channel group.

Optionally, in an embodiment, the transceiver unit 720 is configured to transmit downlink control information DCI corresponding to any downlink channel in the at least one downlink channel group that is received by the terminal device, where, if a feedback timing information field in the DCI indicates a predetermined value, a physical uplink control channel PUCCH resource indication information field in the DCI is used for indicating downlink channel group information corresponding to the received downlink channel.

It should be understood that the network device 700 according to the embodiment of the present disclosure can be correspondingly configured to perform the method 400 in the embodiments of the present disclosure, and the above-mentioned and other operations and/or functions of each unit in the network device 700 are respectively for implementing the corresponding process of the terminal device in the methods in FIG. 6 and will not be repeated here for the sake of brevity.

Therefore, the network device according to the embodiments of the present disclosure transmits the trigger signaling to the terminal device, and the terminal device can determine the feedback information codebook including the feedback information for the at least one downlink channel group based on the trigger signaling, which can effectively reduce redundant information in the feedback information and can also effectively avoid the ambiguity in understanding the actually transmitted downlink channels by the network device and the terminal device, and reduce the uplink control signaling overhead while ensuring the consistent understanding of transmission signaling, thereby improving the transmission performance of the uplink control signaling.

Optionally, the network device 700 can also be correspondingly configured to perform the method 500 in the embodiment of the present disclosure. That is, the transceiver unit 720 is configured to transmit trigger signaling which is used for triggering transmission of feedback information for at least one downlink transmission channel and/or downlink transmission resource by the terminal device and which is used for indicating a total number of bits of feedback information to be transmitted, where the feedback information to be transmitted includes the feedback information for the at least one downlink transmission channel and/or downlink transmission resource.

Optionally, in an embodiment, the trigger signaling includes a target value that is used by the terminal device to determine the at least one downlink transmission channel and/or downlink transmission resource.

Optionally, in an embodiment, the target value is used for indicating a time range that is used by the terminal device to determine the at least one downlink transmission channel and/or downlink transmission resource within the time range.

Optionally, in an embodiment, the target value is the number of the at least one downlink transmission channel and/or downlink transmission resource, or the target value is HARQ progress information corresponding to the at least one downlink transmission channel and/or downlink transmission resource.

Optionally, in an embodiment, the trigger signaling includes a target value, which is the total number of bits of the feedback information to be transmitted.

It should be understood that the network device 700 according to the embodiment of the present disclosure can be correspondingly configured to perform the method 500 in the embodiments of the present disclosure, and the abovementioned and other operations and/or functions of each unit in the network device 700 are respectively for implementing the corresponding process of the terminal device in the methods in FIG. 7 and will not be repeated here for the sake of brevity.

Therefore, the network device according to the embodiments of the present disclosure transmits the trigger signaling to the terminal device so that the terminal device can determine the feedback information codebook including the feedback information for the at least one downlink channel group based on the trigger signaling, which can effectively reduce redundant information in the feedback information and can also effectively avoid the ambiguity in understanding the actually transmitted downlink channels by the network device and the terminal device, and reduce the uplink control signaling overhead while ensuring the consistent understanding of the transmission signaling, thereby improving the transmission performance of the uplink control signaling.

Optionally, the network device 700 can also be correspondingly configured to perform the following. The processing unit 710 is configured to generate DCI, and the transceiver unit 720 is configured to transmit the DCI, where, if a feedback timing information field in the DCI indicates a predetermined value, a PUCCH resource indication information field in the DCI is used for indicating group information of the downlink channel corresponding to the DCI.

Optionally, in an embodiment, if the feedback timing information field in the DCI indicates the predetermined value, the transmission time of the feedback information corresponding to the downlink channel is undetermined; or, if the feedback timing information field in the DCI indicates the predetermined value, the transmission time of the feedback information is determined by first information which is used for triggering transmission of the feedback information by the terminal device.

Optionally, in an embodiment, the predetermined value is infinity.

Optionally, in an embodiment, the downlink channel includes a physical downlink control channel carrying the DCI or a physical downlink shared channel scheduled by the DCI.

Figure 10:
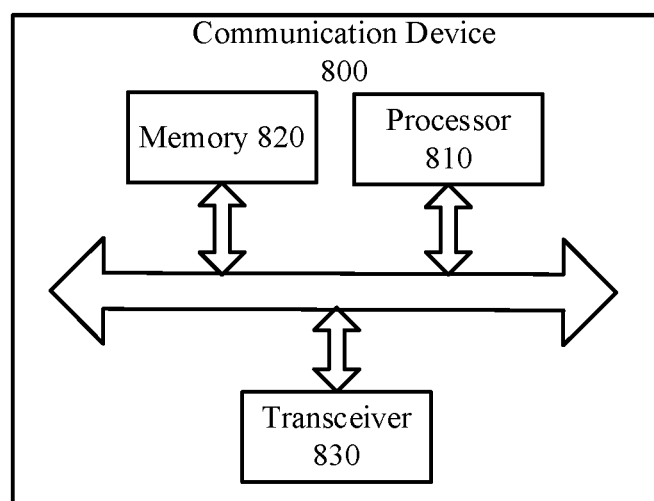
FIG. 10 is a schematic block diagram of a communication device according to an embodiment of the present disclosure.

FIG. 10 is a schematic structural diagram of a communication device 800 according to an embodiment of the present disclosure. The communication device 800 shown in FIG. 10 includes a processor 810 which can invoke and execute a computer program from a memory to implement the methods in the embodiments of the present disclosure.

Optionally, as shown in FIG. 10, the communication device 800 can further include a memory 820 from which the processor 810 can invoke and execute the computer program to implement the methods in the embodiments of the present disclosure.

The memory 820 can be a separate device independent of the processor 810 or can be integrated in the processor 810.

Optionally, as shown in FIG. 10, the communication device 800 can further include a transceiver 830, which can be controlled by the processor 810 to communicate with other devices. Specifically, the transceiver 830 can transmit information or data to other devices or receive information or data transmitted by other devices.

The transceiver 830 can include a transmitter and a receiver. The transceiver 830 can further include one or more antennas.

Optionally, the communication device 800 can particularly be the network device according to the embodiments of the present disclosure, and the communication device 800 can implement the corresponding process implemented by the network device in the methods of the embodiments of the present disclosure which will not be repeated here for the sake of brevity.

Optionally, the communication device 800 can particularly be the mobile terminal/terminal device according to the embodiments of the present disclosure, and the communication device 800 can implement the corresponding process implemented by the mobile terminal/terminal device in the methods of the embodiments of the present disclosure, which will not be repeated here for the sake of brevity.

Figure 11:
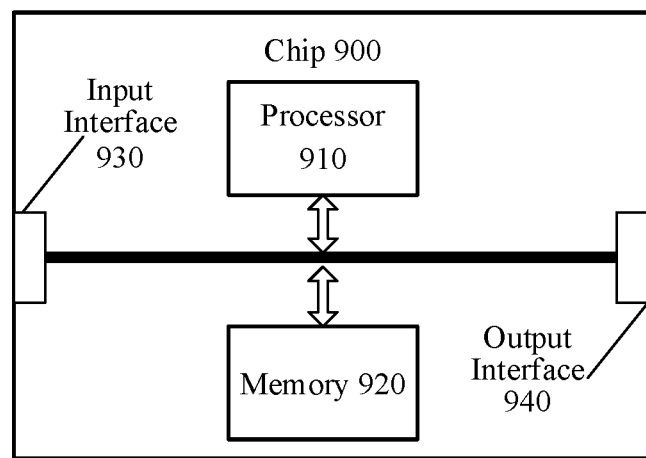
FIG. 11 is a schematic block diagram of a chip according to an embodiment of the present disclosure.

FIG. 11 is a schematic structural diagram of a chip according to an embodiment of the present disclosure. A chip 900 shown in FIG. 11 includes a processor 910 which can invoke and execute a computer program from a memory to implement the methods in the embodiments of the present disclosure.

Optionally, as shown in FIG. 11, the chip 900 can further include a memory 920 from which the processor 910 can invoke and execute the computer program to implement the methods in the embodiments of the present disclosure.

The memory 920 can be a separate device independent of the processor 910, or can be integrated in the processor 910.

Optionally, the chip 900 can further include an input interface 930, which can be controlled by the processor 910 to communicate with other devices or chips. Specifically, it can obtain information or data transmitted by other devices or chips.

Optionally, the chip 900 can further include an output interface 940, which can be controlled by the processor 910 to communicate with other devices or chips. Specifically, it can output information or data to other devices or chips.

Optionally, the chip can be applied to the network device in the embodiments of the present disclosure, and can implement the corresponding process implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding process implemented by the mobile terminal/terminal device in the methods of the embodiments of the present disclosure which will not be repeated here for the sake of brevity.

It should be understood that the chip mentioned in the embodiments of the present disclosure can also be referred to as a system-on-chip, a system chip, a chip system, or a chip of a system-on-chip.

Figure 12:
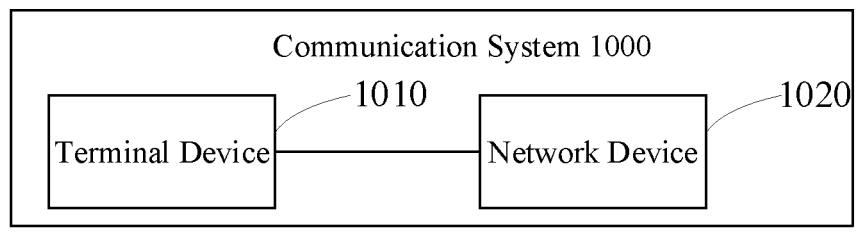
FIG. 12 is a schematic diagram of a communication system according to an embodiment of the present disclosure.

FIG. 12 is a schematic block diagram of a communication system 1000 according to an embodiment of the present disclosure. As shown in FIG. 12, the communication system 1000 includes a terminal device 1010 and a network device 1020.

The terminal device 1010 can be configured to implement the corresponding functions implemented by the terminal device in the above methods, and the network device 1020 can be configured to implement the corresponding functions implemented by the network device in the above methods, which will not be repeated here for the sake of brevity It should be understood that the processor in the embodiments of the present disclosure can be an integrated circuit chip, which has signal processing capabilities. In implementations, the steps of the foregoing method embodiments can be performed by an integrated logic circuit of hardware in the processor or instructions in the form of software. The foregoing processor can be a general-purpose processor, a Digital Signal Processor (DSP), an Application Specific Integrated Circuit (ASIC), a Field Programmable Gate Array (FPGA), or other programmable logic devices, discrete gates or transistor logic devices and discrete hardware components. The methods, steps, and logical blocks disclosed in the embodiments of the present disclosure can be implemented or performed. The general-purpose processor can be a microprocessor, any conventional processor, or the like. The steps of the methods disclosed in connection with the embodiments of the present disclosure can be directly embodied in and executed by a hardware decoding processor or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure can be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memories of the systems and methods described herein are intended to include, but are not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Embodiments of the present disclosure also provide a computer-readable storage medium for storing a computer program.

Optionally, the computer-readable storage medium can be applied to the network device in the embodiments of the present disclosure, and the computer program causes the computer to perform the corresponding process implemented by the network device in the methods of the embodiments of the present disclosure which will not be repeated here for the sake of brevity.

Optionally, the computer-readable storage medium can be applied to the mobile terminal/terminal device in the embodiments of the present disclosure, and the computer program causes the computer to perform the corresponding process implemented by the mobile terminal/terminal device in the methods of the embodiments of the present disclosure which will not be repeated here for the sake of brevity.

The embodiments of the present disclosure also provide a computer program product including computer program instructions.

Optionally, the computer program product can be applied to the network device in the embodiments of the present disclosure, and the computer program instructions cause the computer to perform the corresponding process implemented by the network device in the methods of the embodiments of the present disclosure, which will not be repeated here for the sake of brevity.

Optionally, the computer program product can be applied to the mobile terminal/terminal device in the embodiments of the present disclosure, and the computer program instructions cause the computer to perform the corresponding process implemented by the mobile terminal/terminal device in the methods of the embodiments of the present disclosure, which will not be repeated here for the sake of brevity.

The embodiments of the present disclosure also provide a computer program.

Optionally, the computer program can be applied to the network device in the embodiments of the present disclosure, which, when being executed on the computer, causes the computer to perform the corresponding process implemented by the network device in the methods of the embodiments of the present disclosure, which will not be repeated here for the sake of brevity.

Optionally, the computer program can be applied to the mobile terminal/terminal device in the embodiments of the present disclosure, which, when being executed on the computer, enables the computer to perform the corresponding process implemented by the mobile terminal/terminal device in the methods of the embodiments of the present disclosure, which will not be repeated here for the sake of brevity.

With the above technical solutions, the terminal device can determine the feedback information codebook including the feedback information of the at least one downlink channel group based on the trigger signaling transmitted by the network device, which can effectively reduce redundant information in the feedback information and can also effectively avoid the ambiguity in understanding the actually transmitted downlink channel by the network device and the terminal device, and reduce the uplink control signaling overhead while ensuring the consistency in the understanding of transmission signaling, thereby improving the transmission performance of the uplink control signaling.

Those of ordinary skill in the art can realize that the exemplary units and algorithm steps described in connection with the embodiments disclosed herein can be implemented in electronic hardware, or a combination of computer software and the electronic hardware. Whether these functions are implemented in hardware or software depends on the specific application of the technical solution and design constraints. Various methods can be used by professional technicians to implement the described functions for each specific application, and such implementations should not be considered as beyond the scope of the present disclosure.

Those skilled in the art can clearly understand that for the convenience and conciseness of the description, the specific operating process of the systems, devices and units described above can refer to the corresponding process in the foregoing method embodiments, which will not be repeated here.

According to the embodiments provided in the present disclosure, it should be understood that the systems, devices, and methods disclosed can be implemented in other ways. For example, the device embodiments described above are only illustrative. For example, the division of the units is only a logical function division, and in actual implementations, there can be other divisions. For example, multiple units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the purpose of the solutions of this embodiment according to actual requirements.

In addition, the functional units in the embodiments of the present disclosure can be integrated into a processing unit, or individually exist physically, or two or more of the units can be integrated into one unit.

If the functions are implemented in the form of software functional units that are sold or used as independent products, they can be stored in a computer-readable storage medium. Based on such an understanding, essentially, the technical solution of the present disclosure, a part thereof that contributes to the prior art, or a part of the technical solution can be embodied in the form of a software product, and the computer software product is stored in a storage medium and includes instructions which enable a computer device which may be a personal computer, a server, a network device or the like to perform all or part of the steps of the methods described in the embodiments of the present disclosure. The foregoing storage medium includes various medium such as a USB drive, a portable hard disk, a Read-Only Memory (ROM), a Random Access Memory (RAM), a magnetic disk or an optical disk that can store program codes.

Those described above are only specific implementations of the present disclosure, and the protection scope of the present disclosure is not limited thereto. Any person skilled in the art can easily think of alterations or substitutions which should be covered by the scope of the present disclosure. Therefore, the protection scope of the present disclosure shall be defined by the claims.

What is claimed is:

1. A method for transmitting feedback information, comprising:
receiving, by a terminal device, trigger signaling used for triggering transmission of feedback information for a plurality of downlink channel groups by the terminal device, wherein the plurality of downlink channel groups comprise a first downlink channel group and a second downlink channel group, and a group number of the first downlink channel group is smaller than a group number of the second downlink channel group; and
generating, by the terminal device based on the trigger signaling, a feedback codebook comprising the feedback information for the plurality of downlink channel groups, wherein the feedback information corresponding to the second downlink channel group is appended to the feedback information corresponding to the first downlink channel group in the feedback codebook.

2. The method according to claim 1, wherein each of the plurality of downlink channel groups comprises a plurality of downlink channels, and a bit position of the feedback information corresponding to each of the plurality of downlink channels comprised in each of the plurality of downlink channel groups in the feedback codebook is determined based on a value of a Downlink Assignment Index (DAI) of the downlink channel.

3. The method according to claim 2, wherein the downlink channel with a smaller value of the DAI of the plurality of downlink channels comprised in each of the plurality of downlink channel groups has a smaller bit index in the feedback codebook.

4. The method according to claim 1, wherein the trigger signaling is used for indicating a number of downlink channels comprised in each of the plurality of downlink channel groups.

5. The method according to claim 1, further comprising:
determining a number of bits of the feedback information comprised in the feedback codebook by the terminal device based on a target parameter, a number of downlink channels comprised in each of the plurality of downlink channel groups, and a number of groups of the plurality of downlink channel groups, wherein a value of the target parameter is a maximum number of bits of the feedback information corresponding to each downlink channel in the plurality of downlink channel groups.

6. The method according to claim 1, wherein the plurality of downlink channel groups comprise a physical downlink shared channel and a physical downlink control channel.

7. A terminal device, comprising:
a memory;
a transceiver configured to receive trigger signaling used for triggering transmission of feedback information for a plurality of downlink channel groups by the terminal device, wherein the plurality of downlink channel groups comprise a first downlink channel group and a second downlink channel group, and a group number of the first downlink channel group is smaller than a group number of the second downlink channel group; and
a processor configured to generate a feedback codebook comprising the feedback information for the plurality of downlink channel groups based on the trigger signaling, wherein the feedback information corresponding to the second downlink channel group is appended to the feedback information corresponding to the first downlink channel group in the feedback codebook.

8. The terminal device according to claim 7, wherein each of the plurality of downlink channel groups comprises a plurality of downlink channels, and a bit position of the feedback information corresponding to each of the plurality of downlink channels comprised in each of the plurality of downlink channel groups in the feedback codebook is determined based on a value of a Downlink Assignment Index (DAI) of the downlink channel.

9. The terminal device according to claim 8, wherein the downlink channel with a smaller value of the DAI of the plurality of downlink channels comprised in each of the plurality of downlink channel groups has a smaller bit index in the feedback codebook.

10. The terminal device according to claim 7, wherein the trigger signaling is used for indicating a number of downlink channels comprised in each of the plurality of downlink channel groups.

11. The terminal device according to claim 7, wherein the processor is further configured to:
determine a number of bits of the feedback information comprised in the feedback codebook based on a target parameter, a number of downlink channels comprised in each of the plurality of downlink channel groups, and a number of groups of the plurality of downlink channel groups, wherein a value of the target parameter is a maximum number of bits of the feedback information corresponding to each downlink channel in the plurality of downlink channel groups.

12. The terminal device according to claim 7, wherein the plurality of downlink channel groups comprise a physical downlink shared channel and a physical downlink control channel.

13. A method for transmitting feedback information, comprising:
transmitting, by a network device, trigger signaling which is used for triggering transmission of feedback information for a plurality of downlink channel groups by a terminal device and which is used by the terminal device to determine a feedback codebook,
wherein the feedback codebook comprises the feedback information for the plurality of downlink channel groups, the plurality of downlink channel groups comprise a first downlink channel group and a second downlink channel group, a group number of the first downlink channel group is smaller than a group number of the second downlink channel group, and the feedback information corresponding to the second downlink channel group is appended to the feedback information corresponding to the first downlink channel group in the feedback codebook.

14. The method according to claim 13, wherein each of the plurality of downlink channel groups comprises a plurality of downlink channels, and a bit position of the feedback information corresponding to each of the plurality of downlink channels comprised in each of the plurality of downlink channel groups in the feedback codebook is determined based on a value of a Downlink Assignment Index (DAI) of the downlink channel.

15. The method according to claim 14, wherein the downlink channel with a smaller value of the DAI of the plurality of downlink channels comprised in each of the plurality of downlink channel groups has a smaller bit index in the feedback codebook.

16. The method according to claim 13, wherein the trigger signaling is used for indicating a number of downlink channels comprised in each of the plurality of downlink channel groups.

17. The method according to claim 13, wherein a number of bits of the feedback information comprised in the feedback codebook is determined by the terminal device based on a target parameter, a number of downlink channels comprised in each of the plurality of downlink channel groups, and a number of groups of the plurality of downlink channel groups, wherein a value of the target parameter is a maximum number of bits of the feedback information corresponding to each downlink channel in the plurality of downlink channel groups.

18. The method according to claim 13, wherein the plurality of downlink channel groups comprise a physical downlink shared channel and a physical downlink control channel.

* * * * *